US007999066B2

(12) United States Patent
Balk et al.

(10) Patent No.: US 7,999,066 B2
(45) Date of Patent: Aug. 16, 2011

(54) COPPER REMOVAL FROM ATRP PRODUCTS BY MEANS OF ADDITION OF SULFUR COMPOUNDS

(75) Inventors: Sven Balk, Frankfurt (DE); Gerd Loehden, Essen (DE); Christine Miess, Kahl (DE); Christine Troemer, Hammersbach (DE); Monika Maerz, Alzenau (DE)

(73) Assignee: Evonik Roehm GmbH, Darmstadt (DE)

( * ) Notice: Subject to any disclaimer, the term of this patent is extended or adjusted under 35 U.S.C. 154(b) by 264 days.

(21) Appl. No.: 12/282,011

(22) PCT Filed: Feb. 12, 2007

(86) PCT No.: PCT/EP2007/051304
§ 371 (c)(1),
(2), (4) Date: Sep. 8, 2008

(87) PCT Pub. No.: WO2007/115848
PCT Pub. Date: Oct. 18, 2007

(65) Prior Publication Data
US 2009/0062508 A1 Mar. 5, 2009

(30) Foreign Application Priority Data
Apr. 3, 2006 (DE) .......................... 10 2006 015 846

(51) Int. Cl.
*C08C 1/14* (2006.01)
(52) U.S. Cl. ........ 528/487; 528/480; 528/482; 528/485; 528/502 A; 528/502 D; 525/330.3; 525/330.4; 525/338; 525/339; 525/341; 525/313
(58) Field of Classification Search .................. 528/480, 528/482, 485, 487, 502 A, 502 D, 503; 525/330.3, 525/330.4, 330.5, 338, 339, 341, 343
See application file for complete search history.

(56) References Cited

U.S. PATENT DOCUMENTS

| | | | |
|---|---|---|---|
| 3,531,448 A | 9/1970 | Johnson | |
| 4,098,991 A | 7/1978 | Kang | |
| 4,355,188 A | 10/1982 | Herold et al. | |
| 5,281,696 A | 1/1994 | Gibler | |
| 5,794,403 A | 8/1998 | Oberlander et al. | |
| 6,153,727 A | 11/2000 | Wilkey et al. | |
| 6,348,554 B1 | 2/2002 | Roos et al. | |
| 6,388,032 B1 | 5/2002 | Yamaura et al. | |
| 6,498,209 B1 | 12/2002 | Loehden et al. | |
| 6,566,441 B1 | 5/2003 | Lohden et al. | |
| 6,784,256 B1 * | 8/2004 | Lee et al. ...................... 525/343 |
| 6,794,461 B2 * | 9/2004 | Fujita et al. ................. 525/330.4 |
| 6,809,163 B2 | 10/2004 | Schultes et al. | |
| 6,989,409 B2 | 1/2006 | Loehden et al. | |
| 2006/0281859 A1 | 12/2006 | Suzuki et al. | |
| 2007/0068088 A1 | 3/2007 | Einfeldt et al. | |
| 2007/0117948 A1 | 5/2007 | Loehden et al. | |
| 2007/0193156 A1 | 8/2007 | Kautz et al. | |
| 2007/0193159 A1 | 8/2007 | Schattka et al. | |
| 2007/0196655 A1 | 8/2007 | Schattka et al. | |
| 2007/0208107 A1 | 9/2007 | Schattka et al. | |
| 2007/0208109 A1 | 9/2007 | Kautz et al. | |
| 2007/0259987 A1 | 11/2007 | Schattka et al. | |
| 2008/0057205 A1 | 3/2008 | Lohden et al. | |
| 2008/0237529 A1 | 10/2008 | Schattka et al. | |
| 2008/0262176 A1 | 10/2008 | Loehden et al. | |
| 2008/0292893 A1 | 11/2008 | Loehden et al. | |
| 2008/0293854 A1 | 11/2008 | Schattka et al. | |
| 2009/0048401 A1 | 2/2009 | Loehden et al. | |

FOREIGN PATENT DOCUMENTS

| | | |
|---|---|---|
| EP | 1 028 128 | 8/2000 |
| EP | 1 607 415 | 12/2005 |
| GB | 2 085 457 | 4/1982 |
| WO | 01 40317 | 6/2001 |
| WO | WO 2004/081062 * | 9/2004 |

OTHER PUBLICATIONS

U.S. Appl. No. 12/304,275, filed Dec. 11, 2008, Balk, et al.
U.S. Appl. No. 12/373,892, filed Jan. 15, 2009, Balk, et al.
U.S. Appl. No. 12/373,732, filed Jan. 14, 2009, Balk, et al.
U.S. Appl. No. 12/440,244, filed Mar. 6, 2009, Balk, et al.
U.S. Appl. No. 12/301,903, filed Nov. 21, 2008, Balk, et al.
U.S. Appl. No. 12/441,664, filed Mar. 17, 2009, Schattka, et al.
U.S. Appl. No. 12/290,880, filed Nov. 4, 2008, Einfeldt, et al.
U.S. Appl. No. 12/373,531, filed Jan. 13, 2009, Schattka, et al.
U.S. Appl. No. 12/279,197, filed Oct. 21, 2008, Roos, et al.
U.S. Appl. No. 12/522,269, filed Jul. 7, 2009, Balk, et al.
U.S. Appl. No. 12/674,552, filed Feb. 22, 2010, Balk, et al.
U.S. Appl. No. 12/992,430, filed Nov. 12, 2010, Balk, et al.
Office Action issued on Dec. 28, 2010 in Russian Application No. 2008 143 187.

* cited by examiner

*Primary Examiner* — James Seidleck
*Assistant Examiner* — Frances Tischler
(74) *Attorney, Agent, or Firm* — Oblon, Spivak, McClelland, Maier & Neustadt, L.L.P.

(57) ABSTRACT

The present invention relates to a precipitation process for removing transition metals from polymer solutions. Specifically, it comprises the removal of transition metal complexes which usually comprise copper from polymer solutions after a completed atom transfer radical polymerization.

32 Claims, No Drawings

COPPER REMOVAL FROM ATRP PRODUCTS BY MEANS OF ADDITION OF SULFUR COMPOUNDS

FIELD OF THE INVENTION

The present invention relates to a process for removing transition metals from polymer solutions. Specifically, it relates to the removal of transition metal complexes having a content of up to 1000 ppm. Very specifically, the removal is of transition metal complexes which usually contain copper from polymer solutions after a completed atom transfer radical polymerization.

Atom transfer radical polymerization (referred to hereinafter as ATRP) is an important process for preparing a multitude of polymers, for example polyacrylates, polymethacrylates or polystyrenes. This type of polymerization has brought the goal of tailored polymers a good deal closer. The ATRP method was developed in the 1990s predominantly by Prof. Matyjaszewski (Matyjaszewski et al., J. Am. Chem. Soc., 1995, 117, p. 5614; WO 97/18247; Science, 1996, 272, p. 866). ATRP affords narrow-distribution (homo)polymers in the molar mass range of $M_N$=5000-120 000 g/mol. It is a particular advantage that both the molecular weight and the molecular weight distribution can be regulated. As a living polymerization, it additionally permits the controlled formation of polymer architectures, for example random copolymers or else block copolymer structures. By means of appropriate initiators, unusual block copolymers and star polymers, for example, are additionally accessible. Theoretical fundamentals of the polymerization mechanism are explained, inter alia, in Hans Georg Elias, Makromoleküle [Macromolecules], Volume 1, 6th Edition, Weinheim 1999, p. 344.

STATE OF THE ART

The purification of polymers and polymer solutions has been described many times. For example, low molecular weight compounds can be removed from solutions or else from solid polymers by means of extraction processes. Such a process is described in general terms, for example, in WO 02/28916. However, in order to remove transition metal complexes almost completely—i.e. below a content of 1 ppm—from a polymer solution, a pure extraction is unsuitable. A virtually complete removal of these compounds is, though, of great significance for various reasons. Firstly, transition metals, especially with a coordinated ligand sphere, are particularly colourful compounds. However, colouration of the end product is undesired in many applications. Moreover, transition metals in excessively high concentrations can rule out applications in relation to food contact or cosmetic applications. A reduction in the product quality at relevant concentrations is also entirely to be expected: firstly, metal fractions can catalyse depolymerization and hence reduce the thermal stability of the polymer—secondly, a significant increase in the melt or solution viscosity through coordination of functional groups of the polymer cannot be ruled out.

Not least, the ligands introduced with the transition metal can also entail undesired side-effects. Many of these strongly coordinating compounds, for example the di- or trifunctional amines widespread in ATRP, act as a catalyst poison in subsequent reactions, for example a hydrosilylation. Thus, not only is the removal of the transition metal itself of great interest, but a very efficient reduction in the ligand concentration in the workup is also important. Thus, processes which proceed with destruction of the transition metal complex and exclusive removal of the metal are insufficient for many subsequent reactions and applications. This is especially true since many of these ligands are odour- and colour-intensive.

A specific form of extraction is that of aqueous liquid-liquid extraction from polymer solutions. For example, a copper catalyst is used in the synthesis of polyphenylene oxide and is removed from the polymer solution by aqueous extraction after the polymerization (cf. Ullmann's Encyclopedia of Industrial Chemistry, 5th Edition 1992, Vol. 26 a, p. 606 ff.). A disadvantage of this method is that many polar polymers act as suspension stabilizers and prevent the two liquid phases from separating. Thus, these processes cannot be used, for example, for the workup of polymethyl methacrylates. A further disadvantage is the only very complicated conversion of such a process to industrial production scales.

On the laboratory scale, the removal of the transition metal compound—for example of a copper catalyst—from polymer solutions is usually effected by adsorption on aluminium oxide and subsequent precipitation of the polymer in suitable precipitants or by direct precipitation without an adsorption step. Suitable precipitants are in particular very polar solvents such as methanol. In the case of an appropriate ligand sphere, however, it is also possible to use particularly nonpolar precipitation media such as hexane or pentane. However, such a procedure is disadvantageous for various reasons. Firstly, the polymer is not present in a homogeneous form, for example a granule, after the precipitation. For this reason, the removal and hence the further workup is difficult. Furthermore, large amounts of the precipitant mixed with the solvents, the catalyst residues and further constituents to be removed, such as residual monomers, occur in the precipitation process. These mixtures have to be separated in a complicated manner in subsequent processes. Overall, precipitation processes cannot be converted to industrial scale production and can be employed viably only on the laboratory scale.

In addition, processes are known in which a solid catalyst is removed from the liquid polymer-containing solution. In this case, the catalyst itself becomes insoluble, for example by oxidation, or it is bonded to a solid absorbent or to a swollen but insoluble resin before or after the polymerization. The liquid polymer-containing phase is separated from the insoluble material by filtration or centrifugation. For example, CN 121011 describes a process in which an adsorbent (especially activated carbon or aluminium oxide) is added to the polymer solution after the ATRP process, and then removed by filtration. A disadvantage here is that full removal is possible only by virtue of very large amounts of adsorbent, even though the content of transition metal complexes in the reaction mixture is relatively low. The use of aluminium oxide is also claimed in JP 2002 363213. In JP 2005 015577, JP 2004 1449563 and further documents, basic or acidic silica are used. In JP 2003 096130, JP 2003 327620, JP 2004 155846 and a series of further patents from Kaneka (and Kanegafuchi), acidic hydrotalcites, basic hydrotalcites or combinations of hydrotalcites are used as adsorbents in usually multistage filtration processes. Here too, large amounts of the inorganic material are used. Moreover, such adsorbents are relatively expensive and have to be recycled in a very complicated manner. The economic unviability comes to bear especially in the case of use of ion exchange materials (cf. Matyjazewski et al., Macromolecules, 2000, 33(4), p. 1476-8).

This effect described also forms the basis of the invention in DE 100 15 583, which describes an ATRP process in nonpolar solvents. The transition metal complex becomes insoluble during or after the reaction as a result of oxidation and can be filtered off. However, such processes are suitable only for the preparation of relatively nonpolar polymers.

When polar polymers are prepared, for example polymethyl methacrylates, the polymers are insoluble in the solvent. This procedure is thus employable only to a very restricted extent, in very specific polymerizations. The product range available by this procedure can be widened by means of designing the ligands which, under workup conditions, lead to insolubility of the transition metal complex—as, for example, described in Liou et al., Polym. Prep. (Am. Chem. Soc., Div. Poly. Chem.; 1999, 40(2), p. 380). Analogously, in JP 2005 105265, a complexing agent with EDTA is additionally added to change the solubility. A disadvantage is the very high costs of the ligands. It is also readily apparent to the person skilled in the art that all processes based on purely process-accompanying precipitation without addition of a precipitant can lead only to incomplete catalyst removal. Most prior art processes are therefore multistage processes with addition of assistants which usually function as adsorbents. Corresponding disadvantageous workups with phase separation can also be found in JP 2002 356510.

A centrifugation is often used in such multistage processes. This process of course cannot be extended to industrial scale production volumes in an economically viable manner. Such stages are described in EP 1 132 410 or JP 2003 119219.

In addition, there are also descriptions of electro-chemical processes (cf. Nasser-Eddine et al., Macrom. Mat. Eng., 2004, 289(2), p. 204-7), which, however, on the basis of safety considerations alone, cannot find use in large-volume processes.

Moreover, methods are known in which the polymerization is performed with a catalyst already immobilized on a solid or gel (cf., for example, WO 00/062803; Brittain et al., Polymer. Prepr. (Am. Chem. Soc., Div. Poly. Chem.; 2002, 43(2), p. 275). A disadvantage of this method is in particular the high costs which arise from the catalyst preparation. Furthermore, such reactions are relatively slow owing to the heterogeneous character and the associated poor accessibility of the catalyst centre by the chain ends.

The same applies to the process described in WO 01/84424, in which the initiator is bonded to a solid support. After the polymerization, the polymer chains generated are attached to these solid supports and are eliminated after the removal of the catalyst solution. The main disadvantage of this process is the many uneconomic process steps which are in addition to the actual polymerization. In addition, this process cannot work without filtration and precipitation.

Object

Especially in view of the prior art, it is an object of the present invention to provide a process implementable on the industrial scale for removing transition metal complexes from polymer solutions. At the same time, the novel process shall be performable inexpensively and rapidly. It is a further object of the present invention to provide a process which can be implemented in known plants suitable for solution polymerization without complicated refitting. It is a further object, even after one filtration step, to realize particularly low residual concentrations of the transition metal complexes of below 5 ppm.

In particular, it is an object of the present invention to remove transition metal residues from solutions of an ATRP polymerization after termination of the polymerization. Associated with this, it is an object of the present invention that the properties of the polymer are not changed in any way during the metal removal and that the yield loss can be described as extremely low. In more detail, the narrow molecular weight distribution usually achieved in the ATRP products in particular should remain unchanged during the process according to the invention.

It is a further feature of the present invention that it should be employable irrespective of polymer properties such as functionalities, glass transition temperature, structure, molecular weight, branching or other possible variations, and that these properties are likewise not changed during the process.

It is a further object of the invention also to remove ligands which are possibly released or present in excess in any case from the polymer solution with the transition metal residues.

Solution

The object was achieved by precipitating the transition metal compound by means of addition of a suitable precipitant and then removing it by means of filtration.

In the ATRP process described, the reaction is usually terminated by oxidizing the transition metal. This can be done quite simply by means of introduction of atmospheric oxygen or by addition of sulphuric acid. In the case of copper as the catalyst, some of the metal complex often already precipitates out in this already established procedure. However, this proportion is insufficient for the further processing of the polymer. The problem of optimized catalyst removal was solved by addition of sulphur compounds, for example mercaptans, as a precipitant.

Another part of this invention is that, by means of simple modifications in the filtration, the residual sulphur fractions can additionally be removed virtually completely in a very simple manner. In this way, products are obtained which do not have any unpleasant odour caused by sulphur compounds.

It has been found that, surprisingly, addition of suitable sulphur compounds virtually fully precipitates the copper salts out of the polymer solution. The precipitated salts can also be removed in a very simple manner by means of filtration.

A great advantage of the present invention is the efficient removal of the transition metal complexes from the solution. Use of the process according to the invention makes it possible to reduce the transition metal content with a filtration by at least 80% by weight, preferably by at least 95% by weight and most preferably by at least 99% by weight. In particular embodiments, it is even possible to reduce the transition metal content by more than 99.9% by weight by use of the process according to the invention.

Moreover, it has also been found, surprisingly, that appropriate sulphur compounds have to be used, based on the transition metal compound, only in a minimal excess of 1.5 equivalents, preferably 1.2 equivalents and more preferably below 1.1 equivalents. This minimal excess leads to a residual sulphur content in the polymer solution which is only very low in any case.

For the precipitation, a multitude of different inorganic and organic sulphur compounds and mixtures thereof can be used. Suitable inorganic sulphur compounds are in particular hydrogen sulphide and/or sulphides such as ammonium sulphide.

The inventive precipitants are preferably compounds which contain sulphur in organically bonded form. Especially preferably, these sulphur compounds used for the precipitation of transition metal ions or transition metal complexes have SH groups. With very particular preference, the organic compounds include mercaptans and/or other functionalized or else unfunctionalized compounds which have one or more thiol groups and/or can form corresponding thiol groups under the dissolution conditions. The compound may be hydrogen sulphide or organic compounds such as thioglycolacetic acid, mercaptopropionic acid, mercaptoethanol, mercaptopropanol, mercaptobutanol, mercaptohexanol, octyl thioglycolate, methyl mercaptan, ethyl mercaptan, butyl mercaptan, dodecyl mercaptan, isooctyl mercaptan and tert-dodecyl mercaptan. Most of the examples listed are commercially readily available compounds used as regulators in radical polymerization. However, the present invention is not restricted to these compounds. Instead, what is crucial is that the precipitant used has an —SH group or forms an —SH group in situ under the conditions present in the polymer solution.

In particular, it was found, very surprisingly, that said sulphur compounds used may be compounds which are known as regulators from radical polymerization. The advantage of these compounds is their ready availability, their low cost and the broad variation, which enable optimal adjustment of the precipitation reagents to the particular polymerization system. Regulators are used in radical polymerization in order to control the molecular weight of the polymers.

In radical polymerization, the amount of regulators, based on the monomers to be polymerized, is usually specified as 0.05% by weight to 5% by weight. In the present invention, the amount of the sulphur compound used is not based on the monomers but rather on the concentration of the transition metal compound in the polymer solution. In this sense, the inventive sulphur-containing precipitants are used in 1.5 molar equivalents, preferably 1.2 molar equivalents, more preferably below 1.1 molar equivalents and most preferably below 1.05 molar equivalents.

It is readily apparent to the person skilled in the art that the mercaptans described cannot have any influence on the polymers after termination of polymerization when added to the polymer solution. This is especially true of the molecular weight distributions, the molecular weight, functionalities, glass transition temperature and melt temperature in the case of semicrystalline polymers and structures such as branches or block structures.

It is also readily apparent to the person skilled in the art that a corresponding process which is based, in apparatus terms, exclusively on a filtration of the polymer solution is implementable easily in an industrial scale process without major modifications to existing solution polymerization plants.

A further advantage of the present invention is that the reduction to one or a maximum of two filtration steps allows a very rapid workup of the polymer solution in comparison to many established systems.

In addition, the precipitation and subsequent filtration is effected at a temperature in the range between 0° C. and 120° C., process parameters within a customary range.

A further field of the invention is the efficient, simultaneous removal of the ligands which are either present bonded in the transition metal complexes or are present in free form in the polymer solution as a result of excess use or as a result of possible release during the termination of polymerization. It is very probable that, as a result of the coordination of the sulphur compound to the metal core, the multifunctional amine ligands often used in ATRP are not decoordinated from the metal centre. In this way, a large amount of ligands is precipitated together with the transition metal.

To remove further ligand fractions from the solution, small amounts of insoluble, preferably acidic, assistants can be added before the filtration. These assistants may, for example, be inorganic compounds such as acidic alumina, silica, hydrotalcite or other known acidic compounds insoluble in organic solvents, or mixtures thereof. Alternatively, it is also possible to add insoluble organic polyacids such as polyacrylic acid or polymethacrylic acid or insoluble polymethacrylates or polyacrylates with a high acid content or mixtures thereof, or mixtures thereof with the inorganic compounds listed above. Compared to the use detailed in the prior art of often identical adsorbents, the corresponding assistants are used only optionally in the process according to the invention. Moreover, in comparison to the prior art processes described, only significantly smaller amounts of these assistants are necessary. Their removal is also restricted to one additional filtration step or can also be effected simultaneously in the same filtration step with the removal of the precipitated transition metal compounds.

To reduce the addition of sulphur compounds and/or ligands, adsorbents or adsorbent mixtures may be used. This can be done in parallel or in successive workup steps. The adsorbents are known from the prior art, preferably selected from the group of silica and/or alumina, organic polyacids and activated carbon.

Alternatively, the concentration of free ligands, for example multifunctional amines, can be reduced by the addition of activated carbon (e.g. Norit SX plus from Norit). The activated carbon can also be removed in a separate filtration step or in a filtration step simultaneous with the transition metal removal. In a particularly efficient variant, the activated carbon is not added as a solid to the polymer solution, but rather the filtration is effected with activated carbon-laden filters which are commercially available (e.g. AKS 5 from Pall Seitz Schenk). It is also possible to use a combination of the addition of the above-described acidic assistants and activated carbon, or the addition of the above-described assistants and filtration through activated carbon-laden filters.

A further great advantage of the present invention is the possible use in aqueous systems. Many transition metal sulphides have virtually zero solubility even in water. The system described for the removal of transition metal complexes can thus also be applied to emulsion, miniemulsion, microemulsion and suspension processes.

One problem in the process according to the invention for removing transition metal compounds and ligands from polymer solutions is the use of the sulphur compounds detailed. Fractions of corresponding mercapto compounds remaining in the polymer might lead to an odour impairment of the polymer. Impairment of the product colour and a restricted use spectrum, for example with regard to cosmetic applications, would also be disadvantageous. In the process according to the invention, it is therefore of additional significance to remove the appropriate residues of the mercapto compounds used virtually fully. For this purpose, various known desulphurization processes or gentle oxidation of the thiol groups after the purification process described would be conceivable.

Alternatively, it is, however, a particular part of the present invention that excess fractions of the mercaptans described are simultaneously removed virtually fully without any need for an additional purification step. Firstly, the mercaptans are used, based on the transition metal compounds, only in a minimal excess of 1.5 equivalents, preferably 1.2 equivalents and more preferably below 1.1 equivalents.

Secondly, the content of sulphur compounds is minimized additionally, without a further working step, by the use of the acidic inorganic and/or organic insoluble assistants described and/or activated carbon and/or activated carbon-laden filters for the removal of said ligands.

The present invention is based on the removal of transition metal complexes from all polymer solutions prepared by means of ATRP processes. The possibilities which arise from the ATRP will be outlined briefly below. However, these details do not restrict ATRP and hence the present invention. Instead, they serve to illustrate the great significance and versatile use of ATRP and hence also of the present invention for the workup of corresponding ATRP products:

The monomers polymerizable by means of ATRP are sufficiently well known. A few examples are listed below without restricting the present invention in any way. The notation (meth)acrylate describes the esters of (meth)acrylic acid and here means both methacrylate, for example methyl methacrylate, ethyl methacrylate, etc., and acrylate, for example methyl acrylate, ethyl acrylate, etc., and mixtures of the two.

Monomers which are polymerized are selected from the group of the (meth)acrylates, for example alkyl (meth)acrylates of straight-chain, branched or cycloaliphatic alcohols having 1 to 40 carbon atoms, for example methyl (meth)acrylate, ethyl (meth)acrylate, n-butyl (meth)acrylate, i-butyl (meth)acrylate, t-butyl (meth)acrylate, pentyl (meth)acrylate, 2-ethylhexyl (meth)acrylate, stearyl (meth)acrylate, lauryl (meth)acrylate, cyclohexyl (meth)acrylate, isobornyl (meth)acrylate; aryl (meth)acrylates, for example benzyl (meth)acrylate or phenyl (meth)acrylate, each of which may be unsubstituted or have mono- to tetra-substituted aryl radicals; other aromatically substituted (meth)acrylates, for example naphthyl (meth)acrylate; mono(meth)acrylates of ethers, polyethylene glycols, polypropylene glycols or mixtures thereof having 5-80 carbon atoms, for example tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate and poly(propylene glycol) methyl ether (meth)acrylate. The monomer selection may also include particular hydroxy-functionalized and/or amino-functionalized and/or mercapto-functionalized and/or an olefinically functionalized acrylate or methacrylate, for example allyl methacrylate or hydroxyethyl methacrylate.

In addition to the (meth)acrylates detailed above, the compositions to be polymerized may also comprise further unsaturated monomers which are copolymerizable with the aforementioned (meth)acrylates and by means of ATRP. These include 1-alkenes such as 1-hexene, 1-heptene, branched alkenes, for example vinylcyclohexane, 3,3-dimethyl-1-propene, 3-methyl-1-diisobutylene, 4-methyl-1-pentene, acrylonitrile, vinyl esters, for example vinyl acetate, styrene, substituted styrenes having an alkyl substituent on the vinyl group, for example α-methylstyrene and u-ethylstyrene, substituted styrenes having one or more alkyl substituents on the ring, such as vinyltoluene and p-methylstyrene, halogenated styrenes, for example monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinyl-imidazole, vinyloxolane, vinylfuran, vinylthiophene, vinylthiolane, vinylthiazoles, vinyloxazoles and isoprenyl ethers; maleic acid derivatives, for example maleic anhydride, maleimide, methylmaleimide and dienes, for example divinylbenzene, and also the particular hydroxy-functionalized and/or amino-functionalized and/or mercapto-functionalized and/or an olefinically functionalized compound. In addition, these copolymers can also be prepared in such a way that they have a hydroxyl and/or amino and/or mercapto functionality and/or an olefinic functionality in a substituent. Such monomers are, for example, vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be performed in any halogen-free solvents. Preference is given to toluene, xylene, $H_2O$, acetates, preferably butyl acetate, ethyl acetate, propyl acetate; ketones, preferably ethyl methyl ketone, acetone; ethers; aliphatics, preferably pentane, hexane; alcohols, preferably cyclohexanol, butanol, hexanol, but also biodiesel.

Block copolymers of the AB composition may be prepared by means of sequential polymerization. Block copolymers of the ABA or ABCBA composition are prepared by means of sequential polymerization and initiation with bifunctional initiators.

In addition to solution polymerization, ATRP may also be performed as an emulsion, miniemulsion, microemulsion or suspension polymerization.

The polymerization can be performed at standard pressure, reduced pressure or elevated pressure. The polymerization temperature too is uncritical. In general, it is, however, in the range of −20° C. to 200° C., preferably of 0° C. to 130° C. and more preferably of 50° C. to 120° C.

The polymers obtained in accordance with the invention preferably have a number-average molecular weight of between 5000 g/mol and 120 000 g/mol, more preferably ≦50 000 g/mol and most preferably between 7500 g/mol and 25 000 g/mol.

It has been found that the molecular weight distribution is below 1.8, preferably below 1.6, more preferably below 1.4 and ideally below 1.2.

The initiator used may be any compound which has one or more atoms or atom groups which is radically transferable under the polymerization conditions of the ATRP process. In general terms, suitable initiators include the following formulae:

$$R^1R^2R^3C—X, R^1C(=O)—X, R^1R^2R^3Si—X, R^1NX_2,$$
$$R^1R^2N—X, (R^1)_nP(O)_m—X_{3-n}, (R^1O)_nP(O)_m—$$
$$X_{3-n} \text{ and } (R^1)(R^2O)P(O)_m—X,$$

where X is selected from the group consisting of Cl, Br, I, $OR^4$, $SR^4$, $SeR^4$, $OC(=O)R^4$, $OP(=O)R$, $OP(=O)(OR^4)_2$, $OP(=O)OR^4$, $O—N(R^4)_2$, CN, NC, SCN, NCS, OCN, CNO and $N_3$ (where $R^4$ is an alkyl group of 1 to 20 carbon atoms, where each hydrogen atom may be replaced independently by a halogen atom, preferably fluoride or chloride, or alkenyl of 2 to 20 carbon atoms, preferably vinyl, alkenyl of 2 to 10 carbon atoms, preferably acetylenyl, phenyl which may be substituted by 1 to 5 halogen atoms or alkyl groups having 1 to 4 carbon atoms, or aralkyl, and where $R^1$, $R^2$ and $R^3$ are each independently selected from the group consisting of hydrogen, halogens, alkyl groups having 1 to 20, preferably 1 to 10 and more preferably 1 to 6 carbon atoms, cycloalkyl groups having 3 to 8 carbon atoms, silyl groups, alkylsilyl groups, alkoxysilyl groups, amine groups, amide groups, COCl, OH, CN, alkenyl or alkynyl groups having 2 to 20 carbon atoms, preferably 2 to 6 carbon atoms, and more preferably allyl or vinyl, oxiranyl, glycidyl, alkenyl or alkenyl groups which have 2 to 6 carbon atoms and are substituted by oxiranyl or glycidyl, aryl, heterocyclyl, aralkyl, aralkenyl (aryl-substituted alkenyl where aryl is as defined above and alkenyl is vinyl which by one or two $C_1$- to $C_6$-alkyl groups in which one to all of the hydrogen atoms, preferably one hydrogen atom, are substituted by halogen (preferably fluorine or chlorine when one or more hydrogen atoms are replaced, and preferably fluorine, bromine or bromine if one hydrogen atom is replaced)), alkenyl groups which have 1 to 6 carbon atoms and are substituted by 1 to 3 substituents (preferably 1)

selected from the group consisting of $C_1$- to $C_4$-alkoxy, aryl, heterocyclyl, ketyl, acetyl, amine, amide, oxiranyl and glycidyl, and m=0 or 1; m=0, 1 or 2. Preferably not more than two of the $R^1$, $R^2$ and $R^3$ radicals are hydrogen; more preferably, not more than one of the $R^1$, $R^2$ and $R^3$ radicals is hydrogen.

The particularly preferred initiators include benzyl halides such as p-chloromethylstyrene, hexakis(α-bromomethyl) benzene, benzyl chloride, benzyl bromide, 1-bromo-i-phenylethane and 1-chloro-i-phenylethane. Particular preference is further given to carboxylic acid derivatives which are halogenated at the α-position, for example propyl 2-bromopropionate, methyl 2-chloropropionate, ethyl 2-chloropropionate, methyl 2-bromopropionate or ethyl 2-bromoisobutyrate. Preference is also given to tosyl halides such as p-toluenesulphonyl chloride; alkyl halides such as tetrachloromethane, tribromoethane, 1-vinylethyl chloride or 1-vinylethyl bromide; and halogen derivatives of phosphoric esters such as dimethylphosphonyl chloride.

A particular group of initiators suitable for the synthesis of block copolymers is that of the macroinitiators. These feature macromolecular radicals in 1 to 3, preferably 1 to 2 radicals, and more preferably in 1 radical from the group of $R^1$, $R^2$ and $R^3$. These macroradicals may be selected from the group of the polyolefins such as polyethylenes or polypropylenes; polysiloxanes; polyethers such as polyethylene oxide or polypropylene oxide; polyesters such as polylactic acid or other known end group-functionalizable macromolecules. The macromolecular radicals may each have a molecular weight between 500 and 100 000, preferably between 1000 and 50 000 and more preferably between 1500 and 20 000. To initiate the ATRP, it is also possible to use said macromolecules which have groups suitable as an initiator at both ends, for example in the form of a bromotelechelic. With macroinitiators of this type, it is possible in particular to form ABA triblock copolymers.

A further important group of initiators is that of the bi- or multifunctional initiators. With multifunctional initiator molecules, it is possible, for example, to synthesize star polymers. With bifunctional initiator molecules, it is possible to prepare tri- and pentablock copolymers and telechelic polymers. The bifunctional initiators used may be $RO_2C$—CHX—$(CH_2)_n$—CHX—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, $RC(O)$—CHX—$(CH_2)_n$—CHX—$C(O)R$, $RC(O)$—$C(CH_3)X$—$(CH_2)_n$—$C(CH_3)_3X$—$C(O)R$, $RC(O)$—$CX_2$—$(CH_2)_n$—$CX_2$—$C(O)R$, $XCH_2$—$CO_2$—$(CH_2)_n$—$OC(O)CH_2X$, $CH_3CHX$—$CO_2$—$(CH_2)_n$—$OC(O)CHXCH_3$, $(CH_3)_2CX$—$CO_2$—$(CH_2)_n$—$OC(O)CX(CH_3)_2$, $X_2CH$—$CO_2$—$(CH_2)_n$—$OC(O)CHX_2$, $CH_3CX_2$—$CO_2$—$(CH_2)_n$—$OC(O)CX_2CH_3$, $XCH_2C(O)C(O)CH_2X$, $CH_3CHXC(O)C(O)CHXCH_3$, $XC(CH_3)_2C(O)C(O)CX(CH_3)_2$, $X_2CHC(O)C(O)CHX_2$, $CH_3CX_2C(O)C(O)CX_2CH_3$, $XCH_2$—$C(O)$—$CH_2X$, $CH_3$—CHX—$C(O)$—CHX—$CH_3$, $CX(CH_3)_2$—$C(O)$—$CX(CH_3)_2$, $X_2CH$—$C(O)$—$CHX_2$, $C_6H_5$—CHX—$(CH_2)_n$—CHX—$C_6H_5$, $C_6H_5$—$CX_2$—$(CH_2)_n$—$CX_2$—$C_6H_5$, $C_6H_5CX_2(CH_2)_n$—$CX_2$—$C_6H_5$, o,- m- or p-$XCH_2$—Ph—$CH_2X$, o,- m- or p-$CH_3CHX$—Ph—$CHXCH_3$, o,- m- or p-$(CH_3)_2CX$—Ph—$CX(CH_3)_2$, o,- m- or p-$CH_3CX_2$—Ph—$CX_2CH_3$, o,- m- or p-$X_2CH$—Ph—$CHX_2$, o,- m- or p-$XCH_2$—$CO_2$—Ph—$OC(O)CH_2X$, o,- m- or p-$CH_3CHX$—$CO_2$—Ph—$OC(O)CHXCH_3$, o,- m- or p-$(CH_3)_2CX$—$CO_2$—Ph—$OC(O)CX(CH_3)_2$, $CH_3CX_2$—$CO_2$—Ph—$OC(O)CX_2CH_3$, o,- m- or p-$X_2CH$—$CO_2$—Ph—$OC(O)CHX_2$ or o,- m- or p-$XSO_2$—Ph—$SO_2X$ (X is chlorine, bromine or iodine; Ph is phenylene ($C_6H_4$); R represents an aliphatic radical of 1 to 20 carbon atoms which may be of linear, branched or else cyclic structure, may be satu-rated or mono- or polyunsaturated and may contain one or more aromatics or is aromatic-free, and n is from 0 to 20). Preference is given to using 1,4-butanediol di(2-bromo-2-methylpropionate), 1,2-ethylene glycol di(2-bromo-2-methylpropionate), diethyl 2,5-dibromoadipate or diethyl 2,3-dibromomaleate. If all of the monomer used is converted, the later molecular weight is determined from the ratio of initiator to monomer.

Catalysts for ATRP are detailed in Chem. Rev. 2001, 101, 2921. Predominantly copper complexes are described—other compounds also used include those of iron, cobalt, chromium, manganese, molybdenum, silver, zinc, palladium, rhodium, platinum, ruthenium, iridium, ytterbium, samarium, rhenium and/or nickel. In general, it is possible to use all transition metal compounds which can form a redox cycle with the initiator or the polymer chain which has a transferable atom group. For this purpose, copper can be supplied to the system, for example, starting from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is a variant thereof: in so-called reverse ATRP, it is possible to use compounds in higher oxidation states, for example $CuBr_2$, $CuCl_2$, CuO, $CrCl_3$, $Fe_2O_3$ or $FeBr_3$. In these cases, the reaction can be initiated with the aid of classical free-radical formers, for example AIBN. This initially reduces the transition metal compounds, since they are reacted with the free radicals obtained from the classical free-radical formers. Reverse ATRP has also been described, inter alia, by Wang and Matyjaszewski in Macromolecules (1995), Vol. 28, p. 7572 ff.

A variant of reverse ATRP is that of the additional use of metals in the zero oxidation state. Assumed comproportionation with the transition metal compounds of the higher oxidation state brings about acceleration of the reaction rate. This process is described in detail in WO 98/40415.

The molar ratio of transition metal to monofunctional initiator is generally within the range of 0.01:1 to 10:1, preferably within the range of 0.1:1 to 3:1 and more preferably within the range of 0.5:1 to 2:1, without any intention that this should impose a restriction.

The molar ratio of transition metal to bifunctional initiator is generally within the range of 0.02:1 to 20:1, preferably within the range of 0.2:1 to 6:1 and more preferably within the range of 1:1 to 4:1, without any intention that this should impose a restriction.

In order to increase the solubility of the metals in organic solvents and simultaneously to avoid the formation of stable and hence polymerization-inactive organometallic compounds, ligands are added to the system. In addition, the ligands ease the abstraction of the transferable atom group by the transition metal compound. A list of known ligands can be found, for example, in WO 97/18247, WO 97/47661 or WO 98/40415. As a coordinative constituent, the compounds used as a ligand have at least one or more nitrogen, oxygen, phosphorus and/or sulphur atoms. Particular preference is given in this context to nitrogen compounds. Very particular preference is given to nitrogen-containing chelate ligands. Examples include 2,2'-bipyridine, N,N,N',N'',N''-pentamethyldiethylenetriamine (PMDETA), tris(2-aminoethyl)amine (TREN), N,N,N',N''-tetramethyl-ethylenediamine or 1,1,4,7,10,10-hexamethyltriethylene-tetramine. Valuable information on the selection and combination of the individual components can be found by the person skilled in the art in WO 98/40415.

These ligands can form coordination compounds with the metal compounds in situ or they can be prepared initially as coordination compounds and then be added to the reaction mixture.

The ratio of ligand (L) to transition metal is dependent upon the denticity of the ligand and the coordination number of the transition metal (M). In general, the molar ratio is in the range of 100:1 to 0.1:1, preferably 6:1 to 0.1:1 and more preferably 3:1 to 1:1, without any intention that this should impose a restriction.

For the products worked up in accordance with the invention, there is a broad field of application. The selection of the use examples does not restrict the use of the inventive polymers. The examples shall serve solely to indicate the wide range of possible uses of the polymers described by way of a random sample. For example, polymers synthesized by means of ATRP are used as prepolymers in hotmelts, adhesive compositions, sealant compositions, heat-sealing compositions, for polymer-like reactions or for the formation of block copolymers. The polymers may also find use in formulations for cosmetic use, in coating materials, as dispersants, as a polymer additive, as a compatibilizer or in packaging.

The examples given below are given for better illustration of the present invention but do not restrict the invention to the features disclosed herein.

EXAMPLES

Example 1

A jacketed vessel equipped with stirrer, thermometer, reflux condenser, nitrogen inlet tube and dropping funnel was initially charged under an $N_2$ atmosphere with 15 g of n-butyl acrylate, 15.5 g of butyl acetate, 0.2 g of copper(I) oxide and 0.5 g of PMDETA. The solution is stirred at 60° C. for 15 min. Subsequently, 0.47 g of 1,4-butanediol di(2-bromo-2-methylpropionate) is added at the same temperature. The mixture is stirred at 70° C. for a polymerization time of 4 hours. After introducing atmospheric oxygen for approx. 5 min to terminate the reaction, 0.28 g of thioglycolic acid is added. The solution which had been greenish beforehand spontaneously becomes apricot in colour and a red solid precipitates out. The filtration is effected by means of an elevated-pressure filtration. The mean molecular weight and the molecular weight distribution are finally determined by SEC measurements. The copper content of a dried sample of the filtrate is then determined by means of AAS.

The remaining solution is admixed with 8 g of Tonsil Optimum 210 FF (from Südchemie), stirred for 30 min and then filtered under elevated pressure through an activated carbon filter (AKS 5 from Pall Seitz Schenk). The copper content of a dried sample of this fraction too is determined by means of AAS and a GPC measurement is undertaken.

Example 2

A jacketed vessel equipped with stirrer, thermometer, reflux condenser, nitrogen inlet tube and dropping funnel was initially charged under an $N_2$ atmosphere with 15 g of n-butyl acrylate, 15.5 g of butyl acetate, 0.2 g of copper(I) oxide and 0.5 g of PMDETA. The solution is stirred at 60° C. for 15 min. Subsequently, 0.49 g of 1,4-butanediol di(2-bromo-2-methylpropionate) is added at the same temperature. The mixture is stirred at 70° C. for a polymerization time of 4 hours. After introducing atmospheric oxygen for approx. 5 min to terminate the reaction, 0.8 g of n-dodecyl mercaptan is added. The solution which had been greenish beforehand spontaneously becomes red in colour and a red solid precipitates out. The filtration is effected by means of an elevated-pressure filtration. The mean molecular weight and the molecular weight distribution are finally determined by SEC measurements. The copper content of a dried sample of the filtrate is then determined by means of AAS.

The remaining solution is admixed with 8 g of Tonsil Optimum 210 FF (from Südchemie), stirred for 30 min and then filtered under elevated pressure through an activated carbon filter (AKS 5 from Pall Seitz Schenk). The copper content of a dried sample of this fraction too is determined by means of AAS and a GPC measurement is undertaken.

Comparative Example 1

A jacketed vessel equipped with stirrer, thermometer, reflux condenser, nitrogen inlet tube and dropping funnel is initially charged under an $N_2$ atmosphere with 15 g of n-butyl acrylate, 15.5 g of butyl acetate, 0.2 g of copper(I) oxide and 0.5 g of PMDETA. The solution is stirred at 60° C. for 15 min. Subsequently, 0.48 g of 1,4-butanediol di(2-bromo-2-methylpropionate) is added at the same temperature. The mixture is stirred at 70° C. for a polymerization time of 4 hours. After introducing atmospheric oxygen for approx. 5 min to terminate the reaction, 8 g of Tonsil Optimum 210 FF (from Südchemie) and 4% by weight of water are added to the solution which is stirred for 60 min. The subsequent filtration is effected under pressure through an activated carbon filter (AKS 5 from Pall Seitz Schenk). The mean molecular weight and the molecular weight distribution are finally determined by SEC measurements. The copper content of a dried sample of the filtrate is then determined by means of AAS.

Example 3

A jacketed vessel equipped with stirrer, thermometer, reflux condenser, nitrogen inlet tube and dropping funnel is initially charged under an $N_2$ atmosphere with 10 g of methyl methacrylate, 15.8 g of butyl acetate, 0.2 g of copper(I) oxide and 0.5 g of PMDETA. The solution is stirred at 60° C. for 15 min. Subsequently, 0.47 g of 1,4-butanediol di(2-bromo-2-methylpropionate) is added at the same temperature. The mixture is stirred at 70° C. for a polymerization time of 4 hours. After introducing atmospheric oxygen for approx. 5 min to terminate the reaction, 0.4 g of 2-mercaptoethanol is added. The solution which had been greenish beforehand spontaneously becomes red in colour and a red solid precipitates out. The filtration is effected by means of an elevated-pressure filtration. The mean molecular weight and the molecular weight distribution are finally determined by SEC measurements. The copper content of a dried sample of the filtrate is then determined by means of AAS.

The remaining solution is admixed with 8 g of Tonsil Optimum 210 FF (from Südchemie), stirred for 30 min and then filtered under elevated pressure through an activated carbon filter (AKS 5 from Pall Seitz Schenk). The copper content of a dried sample of this fraction too is determined by means of AAS and a GPC measurement is undertaken.

Comparative Example 2

A jacketed vessel equipped with stirrer, thermometer, reflux condenser, nitrogen inlet tube and dropping funnel is initially charged under an $N_2$ atmosphere with 10 g of methyl methacrylate, 15.8 g of butyl acetate, 0.2 g of copper(I) oxide and 0.5 g of PMDETA. The solution is stirred at 60° C. for 15 min. Subsequently, 0.47 g of 1,4-butanediol di(2-bromo-2- methylpropionate) is added at the same temperature. The mixture is stirred at 70° C. for a polymerization time of 4 hours. After introducing atmospheric oxygen for approx. 5 min to terminate the reaction, 8 g of Tonsil Optimum 210 FF (from Südchemie) and 4% by weight of water are added to the solution which is stirred for 60 min. The filtration is effected by means of an elevated-pressure filtration through an activated carbon filter (AKS 5 from Pall Seitz Schenk). The mean molecular weight and the molecular weight distribution are finally determined by SEC measurements. The copper content of a dried sample of the filtrate is then determined by means of AAS.

TABLE 1

| | Example | | | | |
|---|---|---|---|---|---|
| | Example 1 | Example 2 | Comparison 1 | Example 3 | Comparison 2 |
| Monomer | MMA | n-BA | n-BA | MMA | MMA |
| Cu concentration (polymerization) | | | approx. 5.5 mg/g | | |
| Precipitant | TGA | n-DDM | — | MEOH | — |
| Adsorbent | — | — | alox/silica | — | alox/silica |
| Cu concentration (1st filtration) | 0.1 µg/g | 0.5 µg/g | 44 µg/g | 0.3 µg/g | 22 µg/g |
| Adsorbent | alox/silica/ACF | alox/silica/ACF | alox/silica/ACF | alox/silica/ACF | alox/silica/ACF |
| Cu concentration (2nd filtration) | 0.06 µg/g | 0.2 µg/g | 10 µg/g | 0.09 µg/g | 4 µg/g |
| S content (after addition) | 3.0 mg/g | 3.9 mg/g | — | 5.0 mg/g | — |
| Equivalents relative to Cu | 1.09 | 1.4 | — | 1.8 | — |
| S content (2nd filtration) | 6 µg/g | 48 µg/g | — | 24 µg/g | — |
| $M_n$ (before purification) | 8900 | 9800 | 9900 | 9300 | 9000 |
| $M_w/M_n$ (before purification) | 1.20 | 1.18 | 1.24 | 1.17 | 1.22 |
| $M_n$ (after purification) | 8900 | 9800 | 9800 | 9400 | 9000 |
| $M_w/M_n$ (after purification) | 1.19 | 1.18 | 1.22 | 1.16 | 1.23 |

MMA = methyl methacrylate;
n-BA = n-butyl acrylate;
n-DDM = n-dodecyl mercaptan;
TGA = thioglycolic acid;
MEOH = 2-mercaptoethanol;
alox = aluminium oxide;
ACF = activated carbon filter It is clearly evident from the examples that the already very good results with adsorbents for the removal of transition metal complexes (in this case copper complexes) from polymer solutions can be clearly improved by the preceding precipitation with sulphur compounds. In the examples adduced, which do not serve to restrict the present invention in any way, three different mercaptans used as regulators in radical polymerization were used for precipitation.

The present examples were based on the ATRP process. The polymerization parameters were selected such that it was necessary to work with particularly high copper concentrations: low molecular weight, 50% solution and bifunctional initiator.

It is evident from the results for Example 1 that corresponding sulphur compounds, used even in a very small excess based on the transition metal compound, lead to very efficient precipitation. It is also evident from the examples that more efficient removal of the transition metal compounds from the solution is realizable with all thiol-functionalized reagents than is possible by an already optimized workup with adsorbents. Nevertheless, suitable selection of the precipitant allows the particular result to be enhanced even further. Thus, the use of polar mercaptans such as TGA in nonpolar media is probably more efficient. Conversely, nonpolar precipitants such as n-DDM are more suitable in polar media. An additional functional group such as an alcohol group (MEOH) or an acid group (TGA) can also enhance the removal of the excess sulphur compound.

The data on the residual sulphur contents in the table already show satisfactory removal. Variation within the process according to the invention allows an increase in the removal efficiency over and above this.

The comparison of the molecular weights and molecular weight distributions before and after the workup from all examples and comparative examples shows that the methods employed have no influence on the polymer characteristics.

The invention claimed is:

1. A process for removing one or more transition metal compounds from a polymer solution after an atom transfer radical polymerization (ATRP), wherein the transition metal compounds are precipitated by means of an addition of a precipitant and are then removed by means of filtration, wherein the precipitant is a mercaptan or an organic compound having a thiol group.

2. The process for removing transition metal compounds from a polymer solution after an atom transfer radical polymerization (ATRP) according to claim 1, wherein the precipitant is a regulator customary in radical polymerization technology.

3. The process for removing transition metal compounds from a polymer solution after an atom transfer radical polymerization (ATRP) according to claim 1, wherein the transition metal compounds are precipitated after termination of a polymerization.

4. The process for removing transition metal compounds from a polymer solution after an atom transfer radical polymerization (ATRP) according to claim 1, wherein, based on the concentration of the transition metal compounds, 1.5 molar equivalents of the precipitant are used.

5. The process for removing transition metal compounds from a polymer solution after an atom transfer radical polymerization (ATRP) according to claim 4, wherein, based on the concentration of the transition metal compounds, at most 1.1 molar equivalents of the precipitant are used.

6. The process according to claim 1, wherein the transition metal compounds used as catalysts in the polymerization are selected from the group consisting of copper compounds, iron compounds, cobalt compounds, chromium compounds, manganese compounds, molybdenum compounds, silver compounds, zinc compounds, palladium compounds, rhodium compounds, platinum compounds, ruthenium compounds, iridium compounds, ytterbium compounds, samarium compounds, rhenium compounds and nickel compounds.

7. The process according to claim 6, wherein the transition metal compound used as a catalyst in the polymerization comprises a copper compound.

8. The process according to claim 7, wherein said copper compound is added before the start of the polymerization in the form of $Cu_2O$, $CuBr$, $CuCl$, $CuI$, $CuN_3$, $CuSCN$, $CuCN$, $CuNO_2$, $CuNO_3$, $CuBF_4$, $Cu(CH_3COO)$ and/or $Cu(CF_3COO)$.

9. The process according to claim 6, wherein the catalyst is combined before the polymerization with a nitrogen, oxygen, sulphur or phosphorus compound which can enter into one or more coordinate bonds with the transition metal to form a metal-ligand complex.

10. The process according to claim 9, wherein the ligand used comprises N-containing chelate ligands.

11. The process according to claim 1, wherein an initiator is used in the preceding polymerization which comprises Cl, Br, I, SCN and/or $N_3$.

12. The process according to claim 11, wherein the initiator may have mono-, di- or polyvalent active groups.

13. The process according to claim 1, wherein the polymer is obtained by polymerization of alkyl acrylates, alkyl methacrylates, styrenes, vinyl esters, vinyl ethers, fumarates, maleates, itaconates, acrylonitriles and/or other monomers polymerizable by means of ATRP and/or mixtures of alkyl acrylates, alkyl methacrylates, vinyl esters, vinyl ethers, fumarates, maleates, itaconates, styrenes, acrylonitriles, and/or other monomers polymerizable by means of ATRP.

14. The process according to claim 13, wherein the polymer is obtained by polymerizing alkyl acrylates and/or alkyl methacrylates and/or mixtures which consist predominantly of alkyl acrylates and/or alkyl methacrylates.

15. The process according to claim 1, wherein the polymer has a number-average molecular weight between 5000 g/mol and 120 000 g/mol.

16. The process according to claim 1, wherein the polymer has a molecular weight distribution of less than 1.8.

17. The process according to claim 16, wherein the polymer has a molecular weight distribution of less than 1.4.

18. The process according to claim 1, wherein the polymer, after the removal of the transition metal compound, has no changes regarding the polymer properties of degree of functionalization, glass transition temperature, structure, molecular weight, branching and/or molecular weight distribution.

19. The process according to claim 1, wherein the precipitation and subsequent filtration are performed at a temperature in the range between 0° C. and 120° C.

20. The process according to claim 1, wherein the metal content in the polymer solution decreases by at least 80% by weight as a result of the precipitation and subsequent filtration.

21. The process according to claim 20, wherein the metal content in the polymer solution decreases by at least 95% by weight as a result of the precipitation and subsequent filtration.

22. The process according to claim 1, wherein the precipitant added is reduced by using an adsorbent or an adsorbent mixture.

23. The process according to claim 22, wherein the precipitant added is reduced in parallel by using the adsorbent or the adsorbent mixture.

24. The process according to claim 22, wherein the precipitant added is reduced in a second workup step by using the adsorbent or the adsorbent mixture.

25. The process according to claim 9, wherein the ligands added are reduced by using an adsorbent or an adsorbent mixture.

26. The process according to claim 25, wherein the ligands added are reduced in parallel by using the adsorbent or the adsorbent mixture.

27. The process according to claim 25, wherein the ligands added are reduced in a second workup step by using the adsorbent or the adsorbent mixture.

28. The process according to claim 22, wherein the adsorbent or the adsorbent mixture comprises silica and/or aluminium oxide.

29. The process according to claim 22, wherein the adsorbent or the adsorbent mixture comprises an organic polyacid.

30. The process according to claim 22, wherein the adsorbent or the adsorbent mixture comprises activated carbon.

31. The process according to claim 30, wherein the activated carbon finds use in the filtration in the form of an activated carbon filter.

32. The process according to claim 1, wherein the precipitant is selected from the group consisting of thioglycolacetic acid, mercaptopropionic acid, mercaptoethanol, mercaptopropanol, mercaptobutanol, mercaptohexanol, octyl thioglycolate, methyl mercaptan, ethyl mercaptan, butyl mercaptan, dodecyl mercaptan, isooctyl mercaptan and tert-dodecyl mercaptan.

* * * * *